(12) United States Patent
Kubota

(10) Patent No.: US 8,922,836 B2
(45) Date of Patent: Dec. 30, 2014

(54) IMAGE PROCESSING APPARATUS, METHOD, AND COMPUTER PROGRAM PRODUCT FOR CONVERSION OF RENDERING COMMANDS INTO TRANSPARENT OBJECT

(75) Inventor: Tomohide Kubota, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 917 days.

(21) Appl. No.: 12/948,568

(22) Filed: Nov. 17, 2010

(65) Prior Publication Data

US 2011/0128587 A1 Jun. 2, 2011

(30) Foreign Application Priority Data

Dec. 2, 2009 (JP) ................................ 2009-274954

(51) Int. Cl.
*G06K 15/00* (2006.01)
*G06K 15/02* (2006.01)

(52) U.S. Cl.
CPC ........ *G06K 15/1825* (2013.01); *G06K 15/1822* (2013.01); *G06K 15/1831* (2013.01)
USPC .......................................... 358/3.24; 358/1.18

(58) Field of Classification Search
USPC .......................................................... 358/3.24
See application file for complete search history.

(56) References Cited

U.S. PATENT DOCUMENTS

| | | | |
|---|---|---|---|
| 8,208,169 B2 * | 6/2012 | Clark et al. | 358/1.9 |
| 2004/0164993 A1 * | 8/2004 | Kirkland et al. | 345/592 |
| 2008/0025557 A1 | 1/2008 | Fujiwara | |
| 2009/0168085 A1 * | 7/2009 | Suzuki | 358/1.9 |
| 2014/0085681 A1 * | 3/2014 | Jung et al. | 358/3.01 |

FOREIGN PATENT DOCUMENTS

JP  2008-23960 A  2/2008

* cited by examiner

*Primary Examiner* — Scott A Rogers
(74) *Attorney, Agent, or Firm* — Carter, DeLuca, Farrell & Schmidt, LLP

(57) ABSTRACT

An image processing apparatus according to the present invention performs rendering logic sequence determination, rendering region determination, and transparency conversion determination, and, if conversion to a transparent object is determined to be necessary, performs pattern conversion to convert a target pattern into a transparent object.

13 Claims, 10 Drawing Sheets

=  +  +

TRANSPARENT OBJECT        XOR(1)        AND        XOR(2)

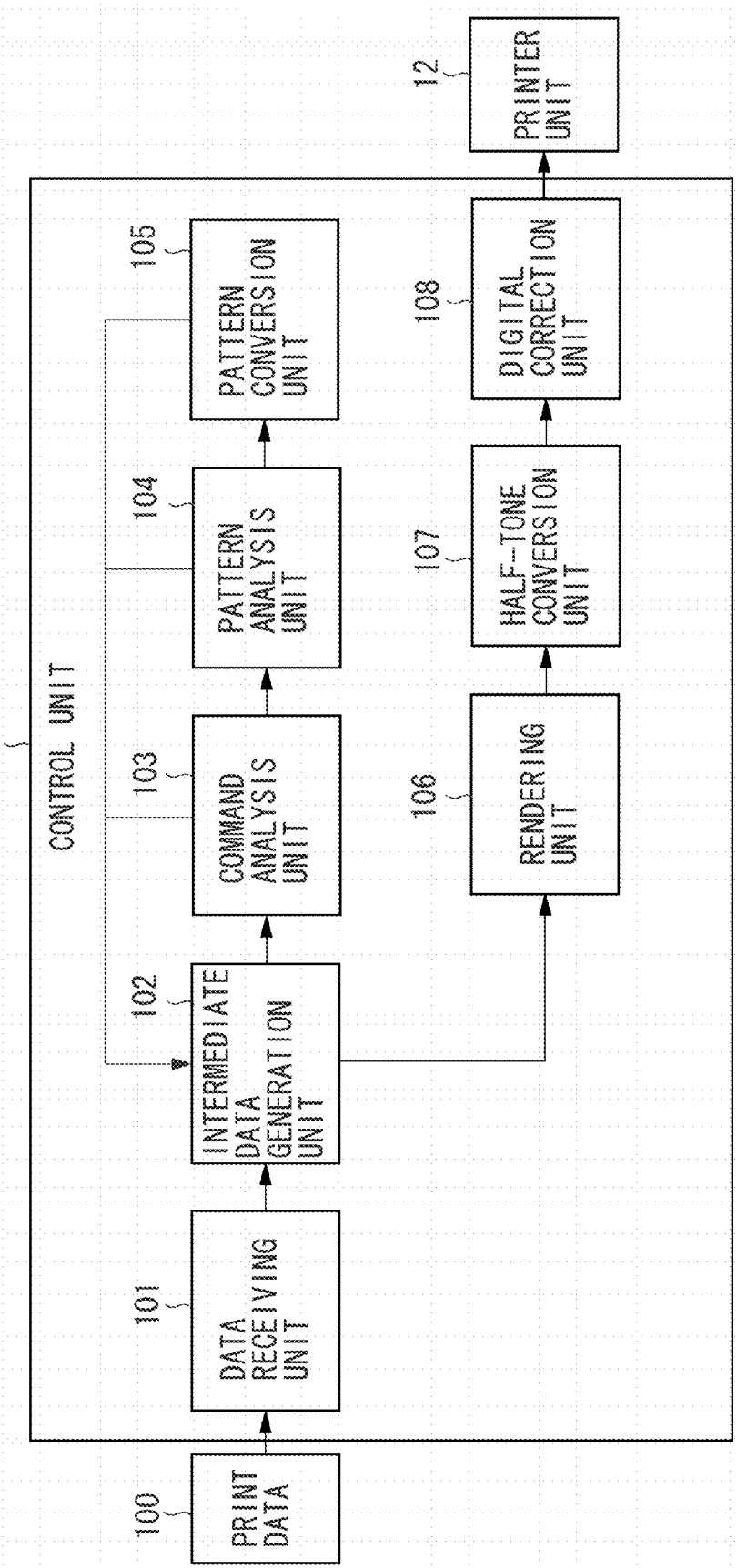

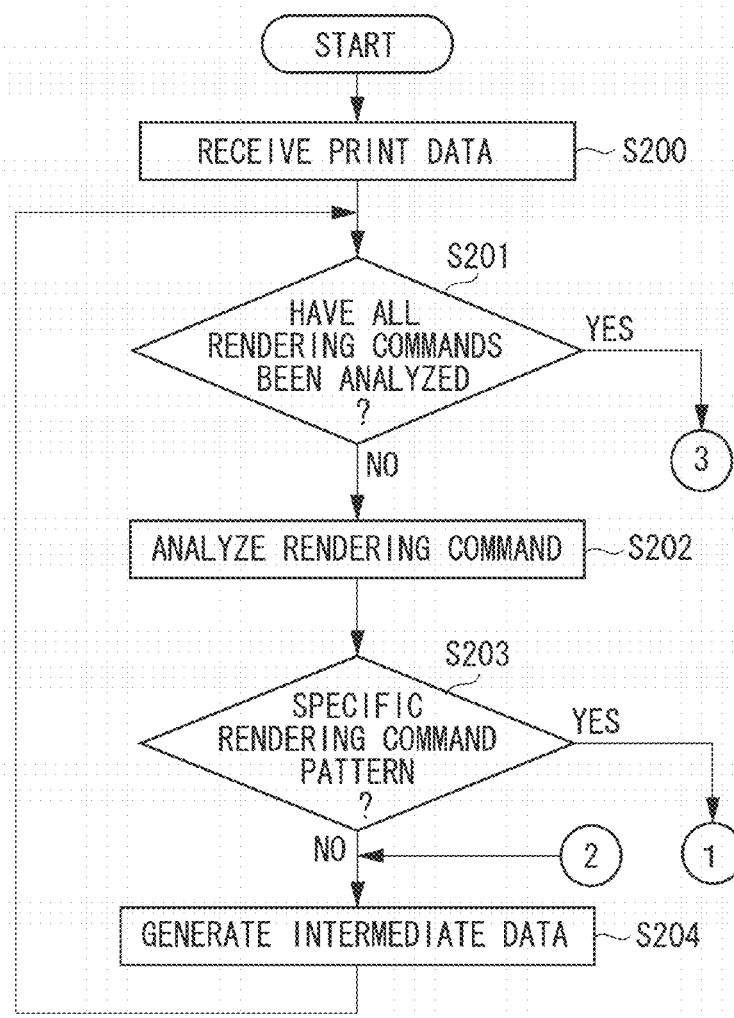

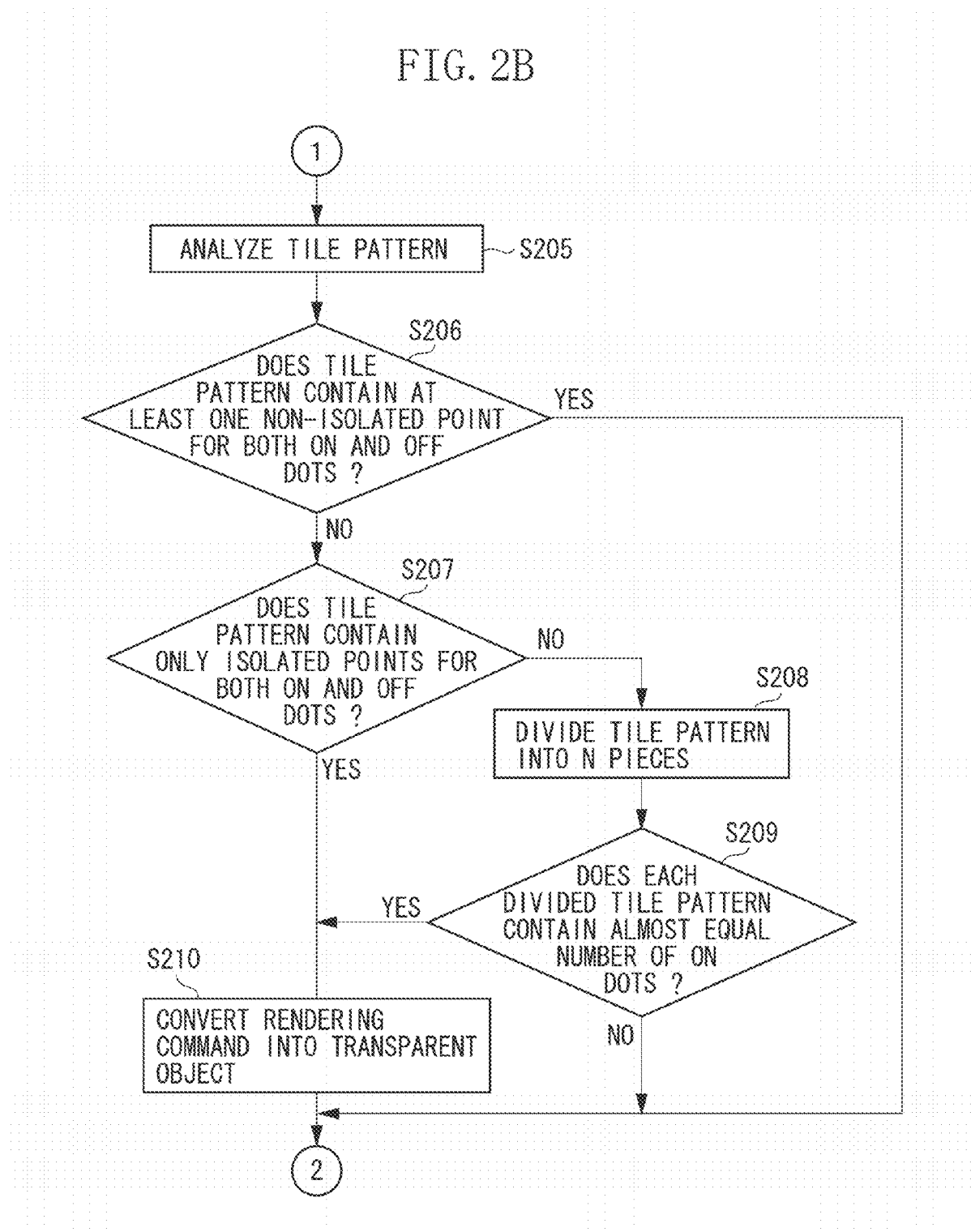

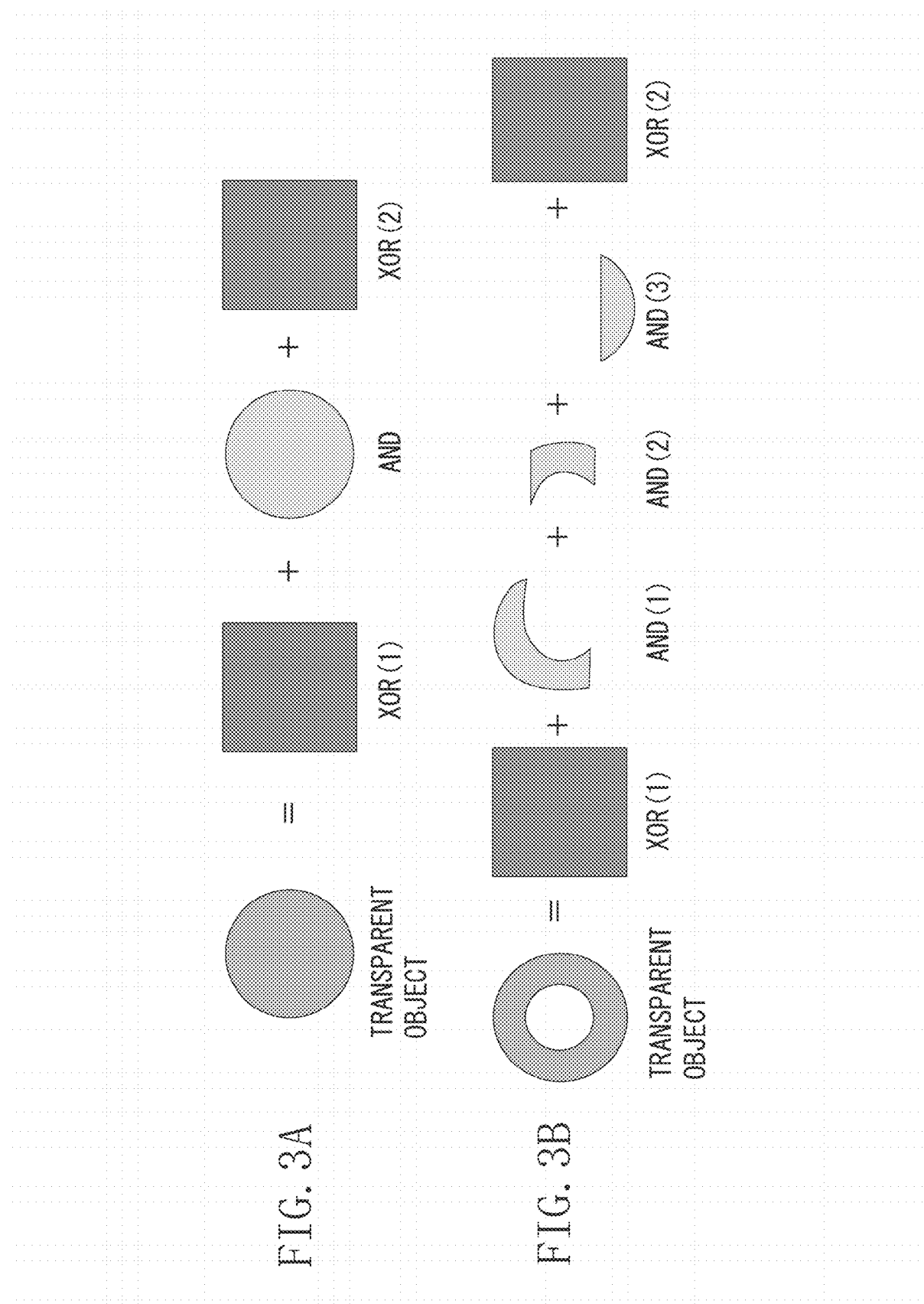

ONLY ISOLATED POINTS
FOR BOTH ON AND OFF DOTS

ONLY ISOLATED POINTS
FOR EITHER ON OR OFF DOT

ONLY ISOLATED POINTS
FOR EITHER ON OR OFF DOT

NO ISOLATED POINT
FOR EITHER ON OR OFF DOT

ISOLATED POINT

FIG. 5A
AND
FIG. 5B
OR

CORRECTED     NOT CORRECTED

IMAGE PROCESSING APPARATUS, METHOD, AND COMPUTER PROGRAM PRODUCT FOR CONVERSION OF RENDERING COMMANDS INTO TRANSPARENT OBJECT

BACKGROUND OF THE INVENTION

1. Field of the Invention

The present invention relates to an image processing apparatus, an image processing method, and a computer-readable recording medium. More particularly, the present invention relates to an image processing apparatus which restrains interference between a pattern and dithering, an image processing method, and a computer-readable recording medium.

2. Description of the Related Art

In printing a document or image data by an image processing apparatus such as a printer, bitmap data corresponding to the document or image data is used. Such an image processing apparatus performs gradation expression through dithering. However, there has been a problem that, when dithering is applied to data at a minute pattern portion such as a checkerboard pattern in a document or an image, an output result is disrupted by interference between the pattern and dithering.

In recent years, with the improvement in performance of information processing apparatuses such as personal computers, functions of applications have been diversified increasing the use of transparent expressions in addition to patterns and filling expressions. However, at the time of printing, even an object transparently expressed on an application may be transparently expressed in a pseudo way by using a pattern in some cases because of a restriction on an interface between a computer and a printer unit. Therefore, in recent years, there has been a trend toward increasing use of print data including a pattern, and accordingly interference between the pattern and dithering has become a serious problem.

There is a technique for digitally correcting print data to correct misalignment caused by bends and inclinations of a laser beam in a printer unit including a laser scanner. This technique eliminates a process for optically adjusting a laser scanner unit. This technique has a problem that interference between a pattern and dithering disturbs digital correction resulting in color unevenness.

In digital correction, in consideration of bends and inclinations of the laser beam, print data (bitmap image) is corrected by shifting in a subscanning direction on a pixel basis in advance by an amount of distortion in an image produced by bends and inclinations of the laser beam.

Further, to reduce a level difference produced by misalignment at a boundary, interpolation processing is applied for correction under pixel. In this correction processing, interpolation is performed at a portion where a level difference is influential (visually noticeable), such as a character and line, and not performed at a portion where a level difference is not influential (visually unnoticeable) since interpolation will cause uneven density. In this way, the processing determines whether or not interpolation is to be performed depending on the type of image data.

However, when an image including interference between a pattern and dithering is used to determine a character, a line, and a gradation image, a change in density is emphasized by the interference and accordingly an image portion that should originally be determined to be a gradation image may be incorrectly determined as a character or a line. As a result, interpolation processing performed based on the incorrect result of determination may cause color (density) unevenness at a gradation image portion.

A technique discussed in Japanese Patent Application Laid-Open No. 2008-23960 analyzes a rendering command included in print data and, when filling with a pattern is specified, converts the relevant command into multi-value data to enable filling with an even density. In particular, data is expressed by an average gradation when filling with an overwrite pattern is specified and by transmittance when filling with a mask pattern is specified. This prevents interference between the pattern and dithering.

The above described conventional method, however, converts data into an average gradation or transmittance when filling with a pattern is specified. With this method, the following two different checkerboard patterns are converted into an average gradation or transmittance. One is a checkerboard pattern composed of minute ON and OFF dots preferably intended to be converted into an average gradation or transmittance, and the other is a checkerboard pattern composed of large ON and OFF dots to some extent not intended to be converted thereinto. In this case, although interference does not occur, an image in a print result may be visually different from what is intended by a user.

Further, since a pattern to be transparently expressed in a pseudo way is expressed with a combination of specific rendering commands, a pattern to be transparently expressed in a pseudo way can be determined by analyzing each rendering command. However, in the determination based only on the combination of rendering commands, there may be a situation that even a pattern other than ones transparently expressed in a pseudo way will be incorrectly determined to be a pattern to be transparently expressed in a pseudo way. Therefore, a pattern that should not originally be converted into a transparent expression may be unnecessarily converted thereinto.

SUMMARY OF THE INVENTION

The present invention relates to conversion of a rendering command into a transparent object with sufficient accuracy.

According to an aspect of the present invention, an image processing apparatus includes a data receiving unit configured to receive print data, a rendering logic sequence determination unit configured to determine whether rendering commands in the received print data are expressed by a rendering logic sequence including one or a plurality of AND rendering logics between two XOR rendering logics, a rendering region determination unit configured to determine, if the rendering logic sequence determination unit determines that the rendering command is expressed by the rendering logic sequence, whether an object expressed by the AND rendering logic is included in a region of an object expressed by the XOR rendering logic, a transparency conversion determination unit configured to analyze, if the rendering region determination unit determines that the object expressed by the AND rendering logic is included in the region of the object expressed by the XOR rendering logic, a pattern of the object expressed by the AND rendering logic to determine whether the object is converted into a transparent object, and a pattern conversion unit configured to convert, if the transparency conversion determination unit determines that the pattern of the object expressed by the AND rendering logic is converted into a transparent object, a pattern expressed by the object expressed by the XOR rendering logic and the object expressed by the AND rendering logic into a transparent object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 1A and 1B illustrate configurations of a first exemplary embodiment of the present invention.

FIGS. 2A to 2C are flow charts illustrating print processing in the present invention.

FIGS. 3A and 3B illustrate examples of states where a transparently expressed object is divided to a plurality of commands.

FIGS. 5A and 5B illustrate examples of methods for determining an isolated point.

DESCRIPTION OF THE EMBODIMENTS

Various exemplary embodiments, features, and aspects of the invention will be described in detail below with reference to the drawings.

Figure 1A:
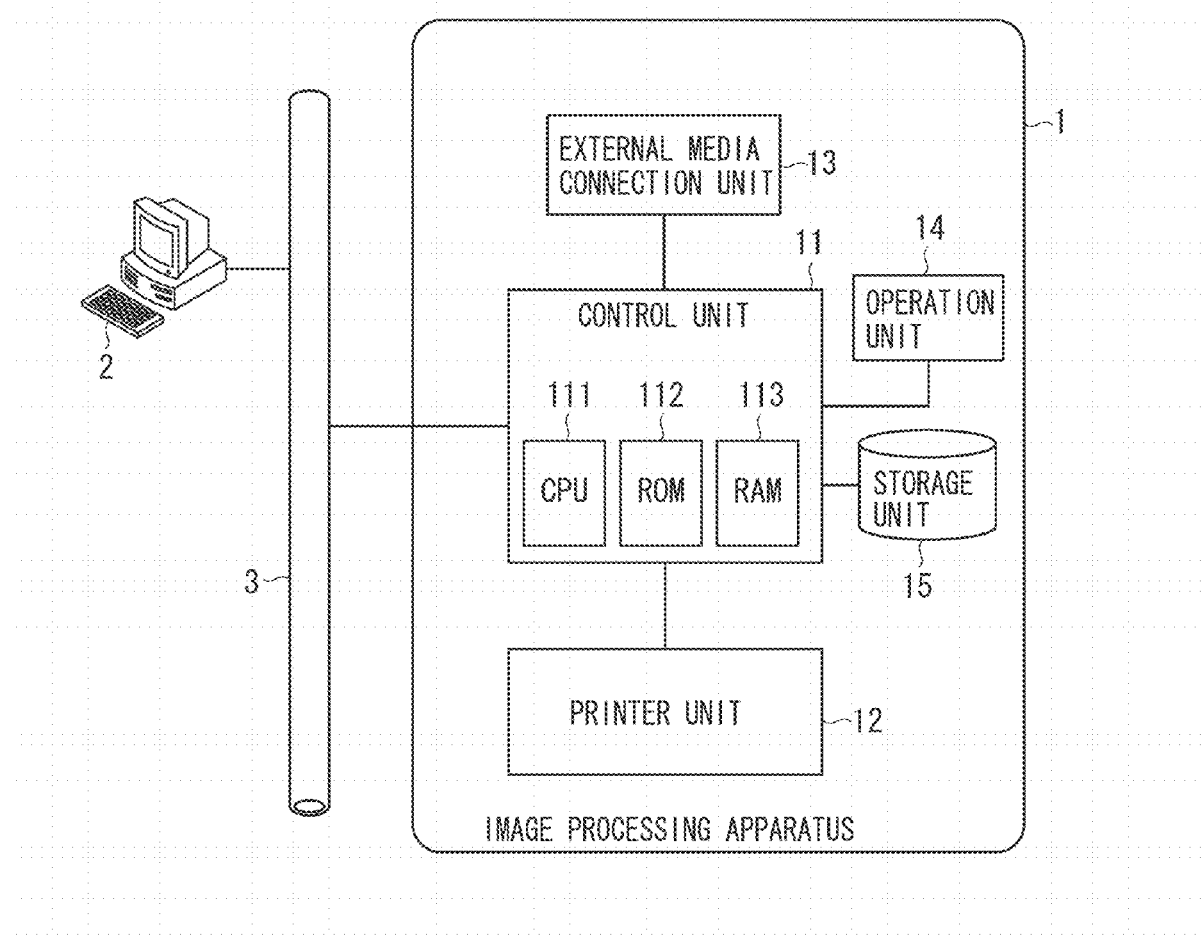

FIGS. 1A and 1B illustrate exemplary system configurations according to an exemplary embodiment of the present invention. FIG. 1A illustrates an exemplary system configuration including an image processing apparatus according to the present exemplary embodiment. FIG. 1B illustrates an exemplary functional block diagram of a control unit included in the image processing apparatus according to the present exemplary embodiment.

An image processing apparatus 1 illustrated in FIG. 1A receives print data, analyzes a rendering command in the received print data, converts the rendering command based on a result of the analysis, and performs print processing. The image processing apparatus 1 may be any one of a multi function printer unit (MFP), a single function printer unit (SFP), and a laser beam printer unit (LBP). Further, the image processing apparatus 1 may be a printer unit using any print system other than the MFP, SFP, and LBP. The image processing apparatus 1 is connected with a host computer 2 which issues various instructions to the image processing apparatus 1 via a local area network (LAN) 3 such as Ethernet.

As illustrated in FIG. 1A, the image processing apparatus 1 includes a control unit 11, a printer unit 12, an external media connection unit 13, an operation unit 14, and a storage unit 15. The control unit 11 totally controls the image processing apparatus 1. The control unit 11 receives print data via the external media connection unit 13, the storage unit 15, or the LAN 3, and performs print processing for the received print data. More specifically, the control unit 11 instructs the printer unit 12 to print the print data.

The control unit 11 includes a central processing unit (CPU) 111, a read only memory (ROM) 112, and a random access memory (RAM) 113 as hardware resources. The CPU 111 generally controls the image processing apparatus 1 based on a control program stored in the ROM 112 or other storage media. The control program is a computer program for implementing a method for controlling the image processing apparatus 1 according to the present exemplary embodiment. The RAM 113 serves as a unit for storing data. More specifically, the RAM 113 is used as a work area by the CPU 111.

The printer unit 12 prints the print data in response to an instruction from the control unit 11. The external media connection unit 13 enables print data to be input from an external medium such as a universal serial bus (USB) memory. The operation unit 14 includes a liquid crystal panel to display various functions and settings as well as statues of the image processing apparatus 1. The storage unit 15 receives and stores print data.

As illustrated in FIG. 1B, the control unit 11 includes a data receiving unit 101, an intermediate data generation unit 102, a command analysis unit 103, a pattern analysis unit 104, a pattern conversion unit 105, a rendering unit 106, a half-tone conversion unit 107, and a digital correction unit 108. The data receiving unit 101 serves as a unit for receiving print data from the external media connection unit 13, the storage unit 15, and the LAN 3. The intermediate data generation unit 102 analyzes a rendering command in the print data, generates intermediate data, and transmits the generated intermediate data to the rendering unit 106. When a certain rendering command is analyzed as a specific rendering command, the intermediate data generation unit 102 transfers processing to the command analysis unit 103. The command analysis unit 103 analyzes the specific rendering command in detail and, when the rendering command satisfies a specific condition, transfers processing to the pattern analysis unit 104. More specifically, the command analysis unit 103 analyzes a type (an XOR rendering logic representing inversion or an AND rendering logic representing overwriting) and a rendering region of the rendering command.

The pattern analysis unit 104 analyzes uniformity and regularity of a tile pattern expressed by the AND rendering logic among the rendering commands analyzed by the command analysis unit 103. When the tile pattern satisfies a specific condition (described in detail below), the pattern analysis unit 104 transfers processing to the pattern conversion unit 105. The pattern conversion unit 105 coverts the rendering command analyzed by the command analysis unit 103 into a rendering command having transparency specification (transparent object) based on the tile pattern analyzed by the pattern analysis unit 104. The rendering unit 106 generates bitmap data based on the intermediate data received from the intermediate data generation unit 102, and then transmits the generated bitmap data to the half-tone conversion unit 107. The half-tone conversion unit 107 applies half-tone processing to the bitmap data received from the rendering unit 106 to generate half-tone data, and then transmits the generated half-tone data to the digital correction unit 108. The digital correction unit 108 applies digital correction processing to the half-tone data based on information about bends and inclinations of a laser beam for forming an electrographic latent image of the image processing apparatus 1.

Figure 2C:
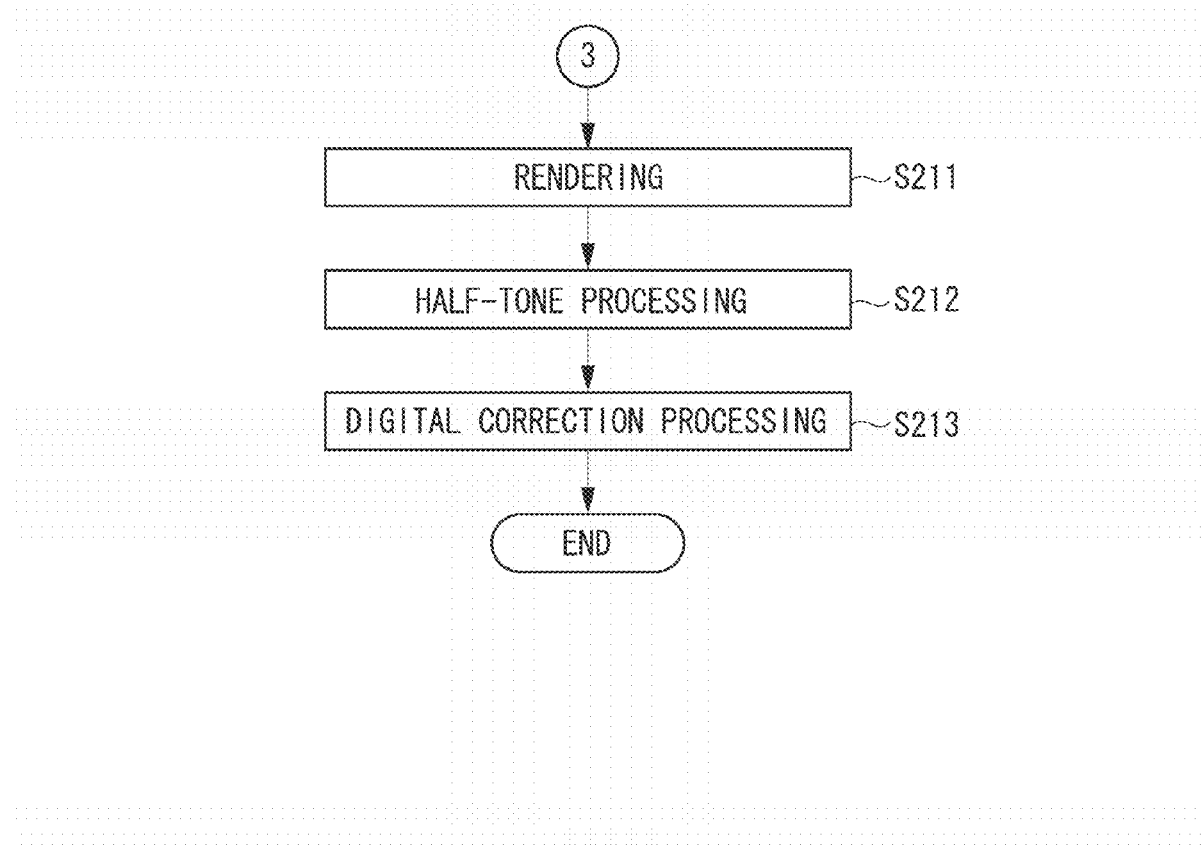

FIGS. 2A to 2C illustrate print processing performed by the image processing apparatus according to the present exemplary embodiment.

In step S200, the data receiving unit 101 included in the control unit 11 receives print data, and then transmits the print data to the intermediate data generation unit 102.

In step S201, the intermediate data generation unit 102 analyzes each of rendering commands in the print data. When there is no rendering command to be analyzed, i.e., all the rendering commands have been analyzed (YES in step S201), the processing proceeds to step S211. When there is a rendering command to be analyzed (NO in step S201), the processing proceeds to step S202.

In step S202, the command analysis unit 103 analyzes each rendering command to identify a rendering logic with which the rendering command is specified.

In step S203, the command analysis unit 103 determines whether the rendering command is specified by a specific rendering logic. When the rendering command is specified by the specific rendering logic (YES in step S203), the processing proceeds to step S205. Otherwise, when the rendering command is not specified by the specific rendering logic (NO in step S203), the processing proceeds to step S204. Specific rendering logics will be described below.

As illustrated in FIG. 3A, an object transparently expressed on an application is converted into a pseudo transparent expression by a printer driver and an operating system (OS) of the host computer 2. With this pseudo transparent expression, the rendering command is expressed by the XOR(1) rendering logic representing inversion providing a wider rendering region than an object, the AND rendering logic representing overwriting composed of a tile pattern in the same rendering region as the object, and the XOR (2) rendering logic having equivalent specification to XOR(1).

In the example illustrated in FIG. 3A, the rendering command is expressed by the XOR(1), AND, and XOR(2) rendering logics in this order. However, as illustrated in FIG. 3B, a plurality of objects expressed by the AND rendering logic may be specified between the XOR(1) and XOR(2) rendering logics. The command analysis unit 103 analyzes the sequence and regions of the XOR and AND rendering logics in this way (referred to as rendering logic sequence determination and rendering region determination, respectively) to determine each rendering command.

The present exemplary embodiment will be described below based on a rendering command pattern illustrated in FIG. 3A. In step S203, the command analysis unit 103 determines whether the rendering command is specified by the XOR rendering logic. When the rendering command is not specified by the XOR rendering logic (NO in step S203), the processing proceeds to step S204. Otherwise, when the rendering command is specified by the XOR rendering logic (YES in step S203), the command analysis unit 103 analyzes the rendering logic of the next rendering command. When the next rendering command is specified by the AND rendering logic and an object specified by the AND rendering logic fits into a region of the object expressed by the XOR rendering logic, the command analysis unit 103 analyzes the rendering logic of the rendering command after the next. When the rendering command after the next is specified by the XOR rendering logic providing the same region as the object expressed by the XOR rendering logic analyzed first, the command analysis unit 103 determines as a specific rendering command pattern, and the processing proceeds to step S205.

In step S204, the intermediate data generation unit 102 generates intermediate data from the rendering command. The intermediate data generation unit 102 transmits the generated intermediate data to the rendering unit 106.

In step S205, the pattern analysis unit 104 analyzes a tile pattern for an object specified by the AND rendering logic in the specific rendering command pattern of XOR-AND-XOR that has been analyzed as described above.

In step S206, the pattern analysis unit 104 determines whether the analyzed tile pattern contains an isolated point for ON and OFF dots. Referring to FIGS. 4A to 4D, black dots denote ON and white dots denote OFF.

As illustrated in FIGS. 4A to 4D, an isolated point refers to a dot surrounded by four (upper, lower, left, and right) inverted dots. When the analyzed tile pattern contains at least one non-isolated point (continuous dot portion) for both ON and OFF dots (for example, FIG. 4D) (YES in step S206), the processing proceeds to step S204 skipping the conversion to a transparent object.

On the other hand, when the analyzed isolated pattern contains only isolated points for at least either ON or OFF dot (for example, FIGS. 4A, 4B, and 4C) (NO in step S206), the processing proceeds to step S207.

Performing the AND and OR operations, as illustrated in FIGS. 5A and 5B, respectively, in each of the vertical and horizontal directions of the tile pattern can determine an isolated point. For example, performing the AND operation in the vertical direction means the AND operation between a certain row (row N) and the subsequent row (row N+1) in the tile pattern. Similarly, performing the AND operation in the horizontal direction means the AND operation between a certain column (column N) and the subsequent column (column N+1) in the tile pattern.

Performing the AND operation in this way, as illustrated in FIG. 5A, can determine whether a non-isolated point exists for ON dots in the tile pattern. Further, performing the OR operation, as illustrated in FIG. 5B, can determine whether a non-isolated point exists for OFF dots in the tile pattern. When there exists no non-isolated point in the tile pattern in each of determinations with the AND and OR operations, the pattern analysis unit 104 determines that only isolated points exist for both ON and OFF dots therein.

Figure 4A:
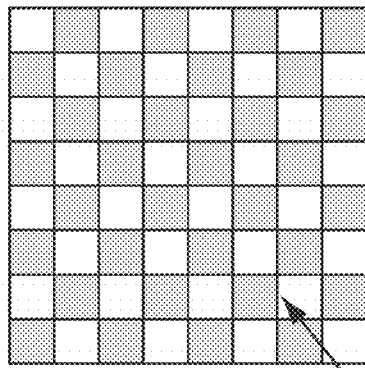
FIGS. 4A to 4D illustrate examples of patterns.
Figure 4B:
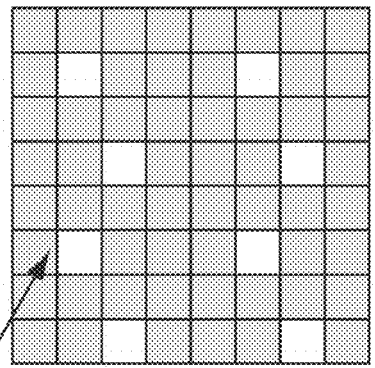
Figure 4C:
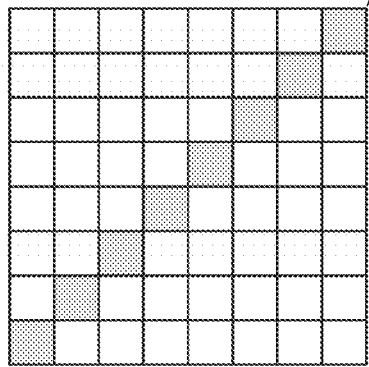
Figure 4D:
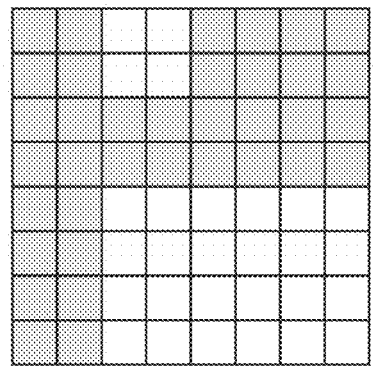

In step S207, the pattern analysis unit 104 determines whether the analyzed tile pattern contains only isolated points for both ON and OFF dots. When the analyzed tile pattern contains only isolated points for both ON and OFF dots (YES in step S207), the processing proceeds to step S210. This means that, in the processing in step S206, there exists no non-isolated point for both ON and OFF dots in the tile pattern, as illustrated in FIG. 4A. Otherwise, when the analyzed tiled pattern contains only isolated points for either ON or OFF dot (for example, FIGS. 4B and 4C) (NO in step S207), the processing proceeds to step S208.

Figure 6A:
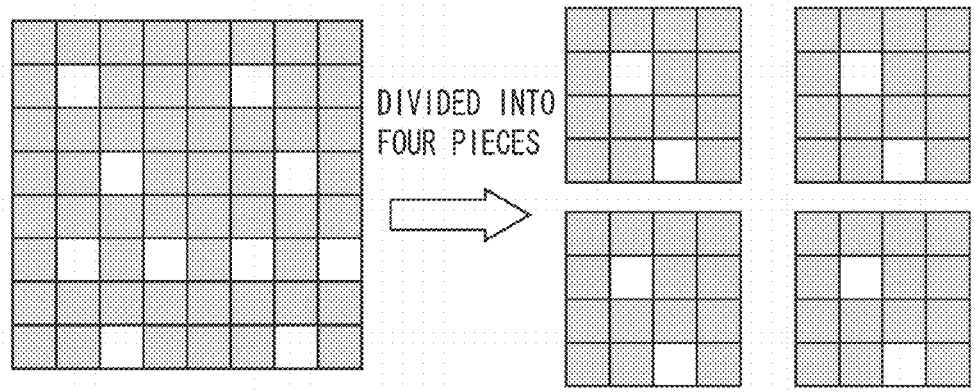
FIGS. 6A and 6B illustrate examples of pattern divisions for determining uniformity of patterns.
Figure 6B:
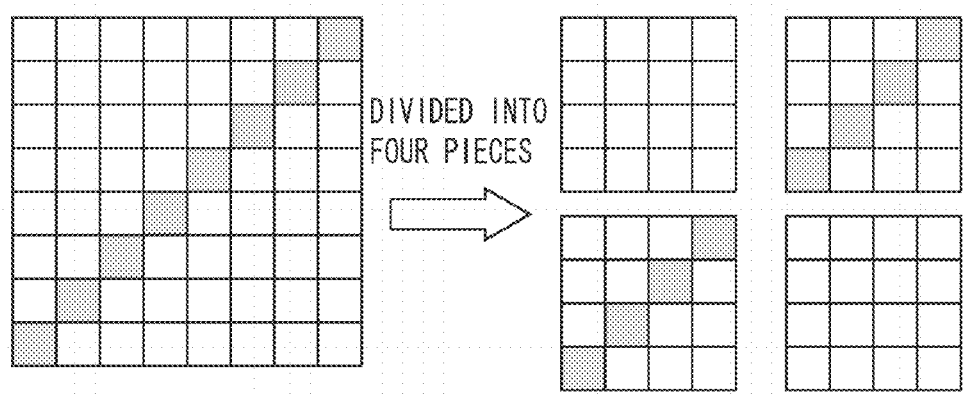

In step S208, the pattern analysis unit 104 divides the tile pattern into N pieces to determine the uniformity of the tile pattern. FIGS. 6A and 6B illustrate exemplary states where the tile pattern is divided into four pieces (division tile patterns). A method for analyzing the tile pattern will be described below with reference to the four division tile patterns.

In step S209, the pattern analysis unit 104 calculates the number of ON dots contained in each tile pattern divided in step S208. Referring to the example in FIG. 6A, the number of ON dots in a top left tile pattern is 14, the number of ON dots in a top right tile pattern is 14, the number of ON dots in a bottom left tile pattern is 14, and the number of ON dots in a bottom right tile pattern is 14. In this case, the number of ON dots in the four division tile patterns can be determined to be uniform.

Referring to the example in FIG. 6B, the number of ON dots in the top left division tile pattern is 0, the number of ON dots in the top right one is 4, the number of ON dots in the bottom left one is 4, and the number of ON dots in the bottom right one is 0. The pattern analysis unit 104 determines whether the rendering command is to be converted into a transparent object, based on the result of comparison of the calculated numbers of ON dots.

When the numbers of ON dots in the division tile patterns are identical or different by one or less (for example, FIG. 6A), the original tile pattern can be determined to be uniform. In this case, the pattern analysis unit 104 determines to convert the rendering command into a transparent object, and the processing proceeds to step S210. This determination is referred to as transparency conversion determination. When the numbers of ON dots in the division tile patterns are different by two or more (for example, FIG. 6B), the pattern analysis unit 104 determines not to convert the rendering command into a transparent object, and the processing proceeds to step S204.

In step S210, the pattern conversion unit 105 coverts the rendering commands expressed by the rendering command pattern of XOR-AND-XOR into a rendering command with transparency specification (a transparent object), based on the number of ON dots in the tile pattern expressed by the AND rendering logic, the rendering region of the tile pattern, and a color value of objects expressed by the XOR rendering logics.

For the conversion to a transparent object, the transmittance α (%), the color value, and the rendering region of the object can be obtained in the following way. When the pattern analysis unit 104 determines that the analyzed tile pattern contains only isolated points for both ON and OFF dots in step S207 (for example, FIG. 4A), the number of ON dots equals the number of OFF dots and therefore the transmittance α can be set to 50%.

When the rendering command is determined to be converted into a transparent object in step S209, the transmittance α is represented by the following formula:

Transmittance α=[100−(Total number of ON dots)/
(Total number of dots in tile pattern)]×100(%)

The color value of the object is expressed as the color value of the objects expressed by the XOR rendering logics. The rendering region of the object is expressed as the region of the object expressed by the AND rendering logic. After the pattern conversion unit 105 coverts the rendering commands into the rendering command with transparency specification (a transparent object), the processing proceeds to step S204.

In step S211, the rendering unit 106 performs rendering processing based on the intermediate data obtained by processing in FIGS. 2A and 2B and received from the intermediate data generation unit 102 to generate image data.

In step S212, the half-tone conversion unit 107 applies half-tone processing to the rendered image data. When the image data is color image data, binary image data is generated for each of cyan (C), magenta (M), yellow (Y), and black (K). The half-tone conversion is not limited to conversion to binary image data but may be any conversion to N-value image data (N>2) as long as quantization is involved.

Figure 7A:
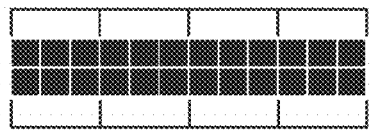
FIGS. 7A to 7E illustrate examples of digital correction.
Figures 7B, 7C:
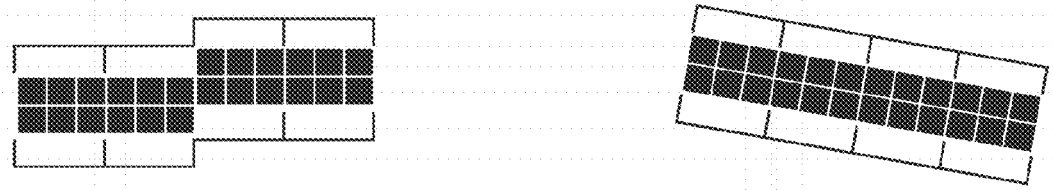
Figure 7D:
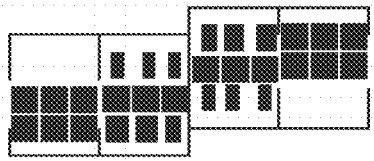
Figure 7E:
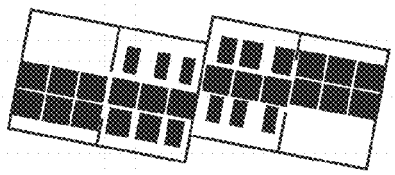

In step S213, the digital correction unit 108 performs digital correction of the image data in consideration of bends and inclinations of the laser beam. Referring to FIGS. 7A to 7E, for example, at the time of printing a half-tone processed image (FIG. 7A) without performing digital correction, when the image is inclined (FIG. 7B) by bends and inclinations of the laser beam, the digital correction unit 108 applies digital correction to the half-tone processed image (FIG. 7A) to generate images in FIGS. 7C to 7E. With digital correction, the image in FIG. 7E obtained as a result of printing the image in FIG. 7D can be close to the half-tone processed image (FIG. 7A). In this way, the image is shifted an amount corresponding to bends and inclinations of the laser beam (a bend of the scanning line at time of image formation) (specifically, the image in FIG. 7A is shifted to the image FIG. 7C), and then interpolation processing is applied to the shifted image (specifically, the image in FIG. 7C is interpolated into the image in FIG. 7D).

In this correction processing, interpolation is performed at a portion where a level difference is influential, such as characters and lines, and not performed at a portion where a level difference is not influential since interpolation will cause uneven density.

Applying pattern matching to the half-tone processed image can determine whether the image is a character or a line including continuous high-density pixels, and determine whether interpolation is to be performed.

An object which includes a tile pattern and is transparently expressed in a pseudo way is converted into a transparent object before rendering, as described above. Therefore, interference between the rendered image and the half-tone processing, described in a conventional technique, can be reduced. Accordingly, it can reduce the possibility that an image portion that should originally be determined as a gradation image is incorrectly determined to be a character or a line, thus performing interpolation processing based on the incorrect result of determination can be prevented.

In step S213, the digital correction unit 108 transmits the digitally corrected image data to the printer unit 12 for print processing.

Further, whether to perform the above described pattern conversion processing in print processing or not may be changed based on setting values set in a setting screen for the printer driver on the host computer 2 or a server, or a setting screen on the operation unit 14 of the image processing apparatus 1.

As described above, in the present exemplary embodiment, analyzing rendering commands and tile patterns enables determination that an originally transparently expressed object has been converted into a tile pattern, and restoration of the converted object to a transparently expressed object. Further, converting a tile pattern into a rendering command with transparency specification enables restraining interference between the tile pattern and dithering.

Accordingly, accuracy in determination of the ON/OFF setting of interpolation processing in digital correction processing for the print data can be improved, thus occurrence of color unevenness or the like can be prevented. Further, since a tile pattern is analyzed, the present exemplary embodiment can prevent a user-created pattern which is not transparently expressed in a pseudo way from being replaced with a transparent expression.

Further, in the present invention, the above described rendering command conversion processing may be performed by the host computer. This means that the above described rendering command conversion processing can be applied at the time of creating print data with the printer driver on the host computer or a server.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-274954 filed Dec. 2, 2009, which is hereby incorporated by reference herein in its entirety.

What is claimed is:

1. An image processing apparatus comprising:
a receiving unit configured to receive a sequence of a plurality of rendering commands for rendering a plurality of objects, wherein the plurality of the rendering commands include two rendering commands for rendering objects of the plurality of objects by XOR rendering logics and a rendering command, between the two rendering commands, for rendering one object of the plurality of objects by AND rendering logic;
a determination unit configured to determine whether a distribution pattern of both on-pixels and off-pixels included in the one object to be rendered by the AND rendering logic has regularity; and a conversion unit configured to convert the plurality of objects into a single transparent object having a transparency parameter which is determined on the basis of the distribution pattern, if the determination unit determines that the distribution pattern has regularity, and not to convert the plurality of objects into a single transparent object having a transparency parameter, if the determination unit determines that the distribution pattern does not have regularity.

2. The image processing apparatus according to claim 1, further comprising:
a generation unit configured to generate intermediate data of the single transparent object converted by the conversion unit; and
a rendering unit configured to perform rendering on a bitmap on the basis of the generated intermediate data.

3. The image processing apparatus according to claim 1, wherein the determination unit includes an analysis unit configured to analyze the distribution pattern and an isolated point determination unit configured to determine that the distribution pattern has regularity if a result of the analysis indicates that both the on-pixels and the off-pixels included in the object to be rendered by the AND rendering logic are located at isolated points.

4. The image processing apparatus according to claim 1, wherein the determination unit includes an analysis unit configured to analyze the distribution pattern and a uniformity determination unit configured to determine whether the distribution pattern has uniformity if a result of the analysis indicates that either the on-pixels or the off-pixels included in the object to be rendered by the AND rendering logic are located at isolated points, and
wherein the uniformity determination unit determines that the distribution pattern has regularity if the uniformity determination unit determines that the distribution pattern has uniformity, and determines that the distribution pattern does not have regularity if the uniformity determination unit determines that the distribution pattern does not have uniformity.

5. The image processing apparatus according to claim 4, wherein the uniformity determination unit includes:
a division unit configured to divide the object to be rendered by the AND rendering logic into a plurality of regions;
a count unit configured to count a number of on-pixels for each of the regions; and
a comparison unit configured to compare the counted numbers of the on-pixels in the respective regions to determine whether the distribution pattern has uniformity.

6. The image processing apparatus according to claim 1, wherein the determination unit includes:
an analysis unit configured to analyze the distribution pattern; and
a continuity determination unit configured to determine that the distribution pattern does not have regularity if a result of the analysis indicates that both the on-pixels and the off-pixels included in the object to be rendered by the AND rendering logic are continuous.

7. The image processing apparatus according to claim 1, wherein in a case where the determination unit determines that the distribution pattern has regularity, intermediate data for rendering the single transparent object converted by the conversion unit is generated, and in a case where the determination unit determines that the distribution pattern does not have regularity, intermediate data for rendering the plurality of objects is generated on the basis of the plurality of rendering commands, and wherein bitmap data generated on the basis of the generated intermediate data is subjected to dithering processing.

8. The image processing apparatus according to claim 1, wherein the conversion unit sets a color value of the single transparent object to a color value of one object of the two objects to be rendered by the XOR rendering logics, and
sets the transparency parameter of the single transparent object to a value obtained based on a ratio of the on-pixels to the off-pixels included in the object to be rendered by the AND rendering logic.

9. The image processing apparatus according to claim 1, wherein the single transparent object that has been converted by the conversion unit is handled as one object in rendering, and
wherein the plurality of the objects that have not been converted by the conversion unit are handled as separate objects, respectively, in rendering.

10. The image processing apparatus according to claim 1, wherein the determination unit determines that the distribution pattern has regularity in a case where the distribution pattern coincides with at least one of predetermined patterns, and
wherein the determination unit determines that the distribution pattern does not have regularity in a case where the distribution pattern does not coincide with any one of the predetermined patterns.

11. The image processing apparatus according to claim 10, wherein the determination unit determines that the distribution pattern has regularity in a case where the on-pixels and the off-pixels included in the object to be rendered by the AND rendering logic are isolated points, respectively.

12. An image processing method comprising:
receiving a sequence of a plurality of rendering commands for rendering a plurality of objects, wherein the plurality of the rendering commands include two rendering commands for rendering objects of the plurality of objects by XOR rendering logics and a rendering command, between the two rendering commands, for rendering one object of the plurality of the objects by AND rendering logic;
determining whether a distribution pattern of both on-pixels and off-pixels included in the one object to be rendered by the AND rendering logic has regularity; and
converting the plurality of objects into a single transparent object having a transparency parameter which is determined on the basis of the distribution pattern, if it is determined that the distribution pattern has regularity,
wherein the plurality of objects is not converted into a single transparent object having a transparency parameter, if it is determined that the distribution pattern does not have regularity.

13. A non-transitory computer-readable medium which stores a program used for causing a computer to execute an image processing method, the method comprising:
receiving a sequence of a plurality of rendering commands for rendering a plurality of objects, wherein the plurality of the rendering commands include two rendering commands for rendering objects of the plurality of objects by XOR rendering logics and a rendering command, between the two rendering commands, for rendering one object of the plurality of the objects by AND rendering logic;
determining whether a distribution pattern of both on-pixels and off-pixels included in the one object to be rendered by the AND rendering logic has regularity; and converting the plurality of objects into a single transparent object having a transparency parameter which is determined on the basis of the distribution pattern, if it is determined that the distribution pattern has regularity, wherein the plurality of objects is not converted into a single transparent object having a transparency parameter, if it is determined that the distribution pattern does not have regularity.

\* \* \* \* \*